(12) United States Patent
Cushing (10) Patent No.: US 7,162,447 B1
(45) Date of Patent: Jan. 9, 2007

(54) METHOD AND SYSTEM FOR OBTAINING A DISCOVERED PRICE

(75) Inventor: David Cushing, Lexington, MA (US)

(73) Assignee: ITG Software Solutions, Inc., Culver City, CA (US)

( * ) Notice: Subject to any disclaimer, the term of this patent is extended or adjusted under 35 U.S.C. 154(b) by 0 days.

(21) Appl. No.: 09/496,188

(22) Filed: Feb. 2, 2000

(51) Int. Cl.
G06Q 40/00 (2006.01)

(52) U.S. Cl. ............................. 705/37; 705/35; 705/36

(58) Field of Classification Search ................. 705/35, 705/36, 37
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,334,270 A | 6/1982 | Towers | |
| 4,674,044 A | 6/1987 | Kalmus | |
| 4,903,201 A | 2/1990 | Wagner | |
| 5,101,353 A * | 3/1992 | Lupien et al. | 705/37 |
| 5,727,165 A | 3/1998 | Ordish | |
| 5,835,896 A * | 11/1998 | Fisher et al. | 705/37 |
| 5,845,266 A | 12/1998 | Lupien | |
| 5,873,071 A | 2/1999 | Ferstenberg et al. | |
| 5,905,974 A | 5/1999 | Fraser | |
| 5,924,082 A | 7/1999 | Silverman | |
| 5,950,176 A | 9/1999 | Keiser et al. | |
| 5,950,177 A | 9/1999 | Lupien | |
| 5,963,923 A | 10/1999 | Garber | |
| 6,012,046 A | 1/2000 | Lupien et al. | |
| 6,016,483 A | 1/2000 | Rickard et al. | |
| 6,421,653 B1 * | 7/2002 | May | 705/37 |
| 6,560,580 B1 * | 5/2003 | Fraser et al. | 705/37 |
| 2002/0019795 A1 * | 2/2002 | Madoff et al. | 705/37 |

\* cited by examiner

*Primary Examiner*—Alain L. Bashore
(74) *Attorney, Agent, or Firm*—Rothwell, Figg, Ernst & Manbeck (57) ABSTRACT

A method and system for determining an optimal price at which to perform a batch auction of financial assets. Orders, according to a variety of predetermined order types, are received from qualified market participants and communicated to an auction system according to the invention. The auction system takes into account each order and its impact upon relative supply and demand to determine by a preset algorithm an optimal price and share transaction quantity. The optimal price is selected by identifying a particular price at which trade volume would be maximized and which reflects the appropriate effect of supply and demand imbalances. Trades are executed at the optimal price, and portions of the transaction quantity are allocated to each investor on a fair basis dependent upon their submitted orders. In another aspect, the auction system includes a computer system and network designed to automatically perform one or more steps of the above method. Such a system is preferably connected to one or more ECNs such that non-executed shares can be automatically sent to outside sources for execution, and connected to real time quote services to obtain current market information.

8 Claims, 4 Drawing Sheets

METHOD AND SYSTEM FOR OBTAINING A DISCOVERED PRICE

FIELD OF THE INVENTION

This invention relates generally to securities markets. Particularly, the invention relates to a system and method for determining an optimal price at which to conduct batch auctions of securities and other assets.

BACKGROUND OF INVENTION

A securities trading mechanism can be thought of as a set of protocols that translate a group of investors' latent demands into realized prices and quantities.

Batch auctions are often used as the blueprint trading mechanism for new, automated trading systems such as that disclosed by U.S. Pat. No. 5,873,071 to Ferstenberq et al. and the systems in use by the Arizona Stock Exchange ("AZX") and the Pacific Stock Exchange ("PSE"). A batch auction is a type of financial market transaction whereby a series of traders simultaneously buy or sell one or more securities at an agreed upon price for each security.

The Ferstenberg et al. patent discloses a method and system for performing off-market intermediated trades of financial securities using periodically conducted batch auctions. In the Ferstenberg system, trades executed during each auction cycle are transacted at a price set equal to the midpoint of the bid-offer spread as quoted by the underlying primary market for the security. The POSIT™ electronic trading system operates in a similar manner to that described in the Ferstenberg patent. Order requests, containing one or more trade orders for one or more assets, are entered into the POSIT system and the trade orders are matched, or "crossed." The matching attempts to satisfy as many of the trade orders in the system as possible. Once the matching is complete, all matched trades within the system are executed at a price equal to the mid-point of the most recently quoted bid-offer spread.

The Arizona Stock Exchange ("AZX") operates solely in a batch auction market format. The AZX has a high degree of transparency in that traders are permitted to view a large portion of the order book prior to a given auction, as well as view beforehand the exact price at which trades would occur. Trade price for each security traded in the auction is selected from one of three prices dictated by the underlying primary market for that security; the highest volume maximizing price, the lowest volume maximizing price, or the mid-point of those two. If bids outweigh offers, then the higher offer price is used. Conversely, if offers dominate, then the bid price is used for the auction. Only if supply and demand are exactly equal, the mid-point of the quoted spread is used as the auction price. Collectively, these attributes put may put traders at informational disadvantages or lead to "gaming" (price manipulation by traders), thus preventing accurate price formation and discouraging order entry.

The OptiMark™ electronic trading system employed by the PSE conducts repeated batch auctions over the course of a market day similar in manner to the AZX, but offers less transparency in that the order book is kept confidential. The OptiMark system generates multiple prices for each security traded in each auction such that, for example, all sellers of a particular stock during a given auction are not given the same price. This result is very undesirable to traders, especially when large blocks of shares are traded as is commonly done in batch auctions.

U.S. Pat. No. 6,012,046 to Lupien et al. discloses an electronic securities trading system for crossing orders based upon a price and quantity satisfaction profile specific to each trader. Participating traders submit such a profile in two-dimensional matrix form for each stock they desire to trade in. This matrix is used by traders to specify relative pricing satisfaction information for each stock, and trades are conducted at a price determined from the relative pricing information. The Lupien patent, however, teaches an allocation of the exchanged stock shares among traders based upon time and price priority of the orders. This priority feature often causes the inherent drawback of disparities in fill rates and prices among participating traders which are undesirable in the financial community. Furthermore, the complexity of the order entry process, including the completion of a price matrix for each asset desired to be traded and the lack of market order support, makes such a system unfriendly to traders.

U.S. Pat. No. 5,950,176 to Keiser et al. discloses an electronic securities trading system which uses a computer program to project price movement of securities and set suggested prices for trading in continuous trading markets. This system however does not solve the problems attendant in batch auction methods and systems where providing optimal price determination is hampered by gaming and low liquidity.

The prior art approaches to setting the transaction prices of securities during batch auctions have numerous drawbacks. The existence of order books having high levels of transparency and different execution priority rules, as used by the AZX, produce undesirable disparities in fill rates, discourages order entry and may lead to gaming. An additional drawback of such a batch auction design is that it often is not sufficient to produce accurate pricing in low liquidity, high volatility markets as is present for thinly traded stocks. Price discrimination among traders within a single auction based upon their order types and the use of highly complex order formats, as done by the PSE OptiMark system and the Lupien patent, can cause dissatisfaction among participating traders with the outcome produced by the auction system.

Due to the above-mentioned and other drawbacks, there remains a need in the art for improved price setting methods and systems to sufficiently and efficiently conduct batch auctions of financial securities in financial markets.

SUMMARY OF THE INVENTION

Therefore, it is an object of the present invention to provide a method and system for performing securities transactions via a batch auction, whereby the system conducts the auction at a single price.

It is also an object of the present invention to provide a method and system for performing batch auctions of securities wherein an optimal price is chosen which more fully reflects the impact of supply and demand.

Further, it is an object of the invention to provide a method and system for performing batch auctions of financial assets whereby the price at which the auction occurs is dictated by the order requests of traders.

Additionally, it is an object of the present invention to provide a method and system for performing such transactions which provides for selecting an appropriate auction price when matched orders within the auction do not identify an optimal price.

Finally, it is an object of the present invention to provide a method and system for conducting batch or call auctions which calculates a single optimal price for each asset, and then fairly allocates trades of each asset executed at that optimal price among orders.

The present invention provides a method and system for determining (or "discovering") a price and share quantity based on the aggregate supply and demand represented by all orders submitted for a given auction. The method and system can be advantageously used for trading in financial assets on, for example, Nasdaq, POSIT and in electronic communications networks ("ECNs"). Financial assets according to the present invention include stocks, bonds, commodities, options, futures contracts, pollution rights as well as other tangible and intangible goods and rights. A full iteration of the system, comprised sequentially of an order acceptance period, a price discovery period, and an order execution period, is referred to as an "auction cycle". Each batch auction cycle is typified in that a series of investors simultaneously trade, i.e., buy or sell, a stock at a single price. Auction cycles according to the present invention operate at pre-determined times that are known to qualified auction participants, such as (but not limited to) traders.

One aspect of the invention comprises a method for performing a batch auction whereby a series of orders, according to a variety of predetermined order types, are generated by qualified market participants and communicated to the auction system. The system takes into account each order and its impact upon relative supply and demand. For each security in question, bids and offers are crossed to determine by a preset algorithm a "discovered" price and share transaction quantity. Trades are executed, and a portion of the transaction quantity is allocated to each investor on a fair basis dependent upon their initial orders.

In preferred embodiments of the present invention, the auction method is performed using a computer system or network designed to automatically perform one or more steps of the method. Qualified market participants therefore may submit orders to the auction system electronically whereby the orders are then electronically stored, such as in a computer database, until such time as the orders are modified or canceled by the submitting participant or until commencement of the price discovery period. During the price discovery period, orders received during the order acceptance period are crossed according to a present price discovery algorithm being performed by software running on one or more computers. Using the algorithm, the computer identifies an optimal price and allocation of trades. These trades are then executed at the optimal price and returned to the qualified participant during the subsequent order execution period.

Another embodiment of the present invention comprises an electronic system for conducting batch auctions of securities. Such a system can be comprised of a computer network designed to accept a plurality of orders from a variety of sources. At a predetermined time, all current orders are crossed according to a preset price discovery algorithm to determine an optimal share price and quantity for each security being traded. A trade of shares in an amount equal to the quantity is automatically executed by the system at the discovered price, and then fairly allocated to each order source. Therefore, a computer system according to the present invention, comprised of software and accompanying hardware, would permit auction participants electronically and automatically to carry out the intermediated exchange of assets at a market determined optimal price.

The present invention will become more fully understood from the forthcoming detailed description of preferred embodiments read in conjunction with the accompanying drawings. Both the detailed description and the drawings are given by way of illustration only, and are not limitative of the present invention as claimed.

DETAILED DESCRIPTION OF THE INVENTION

Each auction cycle in a batch system is typified in that a series of investors simultaneously trade, i.e., buy or sell, a stock at a single price. The present invention comprises a method and system for conducting an intermediated batch auction of financial assets by crossing order requests from a plurality of traders as is described in detail by U.S. Pat. No. 5,873,071 to Ferstenberg et al., the specification of which is herein incorporated by reference. This crossing process generally entails an iterative process whereby a substantially maximized amount of each asset within the auction is exchanged amongst participants, subject to the constraints that for each asset exchanged, the total amount of shares sold equals the total amount of shares bought by all participants, and the amount bought or sold by each participant is within that participant's acceptable bounds. According to the present invention, all shares of a given asset are exchanged during each auction at a single price, preferably an optimal price, determined from the supply and demand imbalances produced by crossed orders.

A batch auction cycle of the present invention is comprised of three sequential periods: an order acceptance period, a price discovery period, and an order execution period. During the order acceptance period, the system accepts orders from qualified participants. The definition of a qualified participant will vary as is known in the art depending on how the system is implemented, as well as on the types of financial instruments traded and the country in which it is operated. This definition will often depend on whether the system is implemented as a facility of an established market or exchange. In this case, who are deemed qualified participants will likely be defined or limited by the exchange's rules.

Each order submitted essentially represents the bounds, as defined by the order-submitting trader, within which a purchase/sale of a financial asset is desired. All orders generally are comprised of a trade "side" (buy or sell), an asset identifier (such as the name or symbol of a security), and a quantity of shares. In embodiments of the present invention, a variety of order types can be used by traders to more thoroughly describe the conditions under which they desire to trade.

A first general category of such order types is "unpriced orders." The submission of an unpriced order to the system identifies a desire by the submitter to participate in the auction at whatever price is discovered (if any) during the later price discovery period. If no price is discovered during the price discovery period, unpriced orders would be matched at a predefined reference price. An unpriced order for a given auction cycle is fully specified by the above three basic elements: a security identifier, an order quantity, and a trade side.

Optionally, a maximum (minimum) acceptable transaction price can be specified in an unpriced buy or sell order ("I will not sell for less than $100.00 per share"). This price, however, serves as an extreme upper and lower limit and will thus not influence the price discovery algorithm as it is described below with respect to the price discovery period.

Another general category of such order types which can be submitted to the system is "priced orders." Priced orders are fully specified by four elements: security identifier, order quantity, trade side (i.e. buy or sell), and a desired price. This desired price represents an offer by the trader (e.g., "I will sell X shares for $100.00 per share"), and is used during the price discovery period, described in detail below, to determine the price at which the auction will take place.

In preferred embodiments of the present invention, at the user's option, any unexecuted shares (due to a mismatch in buy and sell orders) of a priced order after the order execution period can be automatically forwarded to another ("secondary") destination at the end of the auction cycle. While not all destinations will necessarily be supported, the user will be able to choose among supported destinations. Where practical, support for unique order attributes of a particular secondary destination, such as "reserve quantity," or "pegging", etc., will be provided.

Additionally, in preferred embodiments of the present invention, the supplied price stated in priced orders, and the optional minimum/maximum transaction limit prices stated in unpriced orders, may be supplied in terms of the quoted market for the underlying security, such as equal to the bid, offer, or the mid-point of the bid-offer spread. Alternatively, the supplied price and limit price can be stated in variable form dependent upon fluctuations of known market indicators (e.g., futures price movement) and indices (e.g., the S&P 500) which occur between the time the order is submitted and the time the auction begins. Such relative priced and unpriced orders could, for example, represent the traders desire to not pay more than the current offer on the underlying market, or to have the order protected against an interim precipitous drop in a given market index.

A third category of orders which may be submitted according to embodiments of the present invention is "cross orders." A cross order is similar to an a unpriced order in that it contains quantity and trade side terms, but is distinguished in that two sides (both buy and sell) of a transaction are submitted to the system as a unit to be crossed at the discovered price. Such an order type is essentially a tool to allow large blocks of shares of a particular stock to be traded quickly between two accounts at a market determined price (the discovered price). The opposing sides of a cross order cannot be broken up. If no price is discovered by the execution of priced orders within that particular auction cycle, cross orders will have the option of being returned unexecuted, being held over for the next auction cycle, or being crossed at a reference price that will be computed as part of the auction process.

Every order request containing one or more order types received from qualified participants during the order acceptance period is entered into an order book. In preferred embodiments of the invention wherein computerized systems are employed, the order requests may be received via phone, fax, or electronically via computer network connections. Preferably, the order book is maintained electronically, such as in the form of a computer database.

During the entire order entry period, the orders contained within the order book are kept confidential. This feature therefore allows participants to submit new order requests, or requests seeking to cancel or modify existing orders throughout the entire order acceptance period without introducing the adverse effects caused by gaming.

At the beginning of the second period of the auction cycle, the price discovery period, no more new order requests are accepted, and the order book is examined to identify for each asset in the auction, the price at which the asset will trade. If after crossing the orders in the order book, there is identified either a single price at which a maximum number of shares of a given asset will be exchanged, then that price is considered optimal and is set as the discovered price for that asset. If a range of prices is identified which would cause a maximum number of shares of a given asset to be exchanged, then an optimal price that reflects supply and demand considerations is selected from the identified range of prices and is set as the discovered price. In the event that no share maximizing price or range of prices is identified (as is the case where priced orders do not intersect after crossing), a reference price is set as the discovered price. A suitable algorithm for determining both a discovered price and a reference price is described in detail below.

Figure 1:
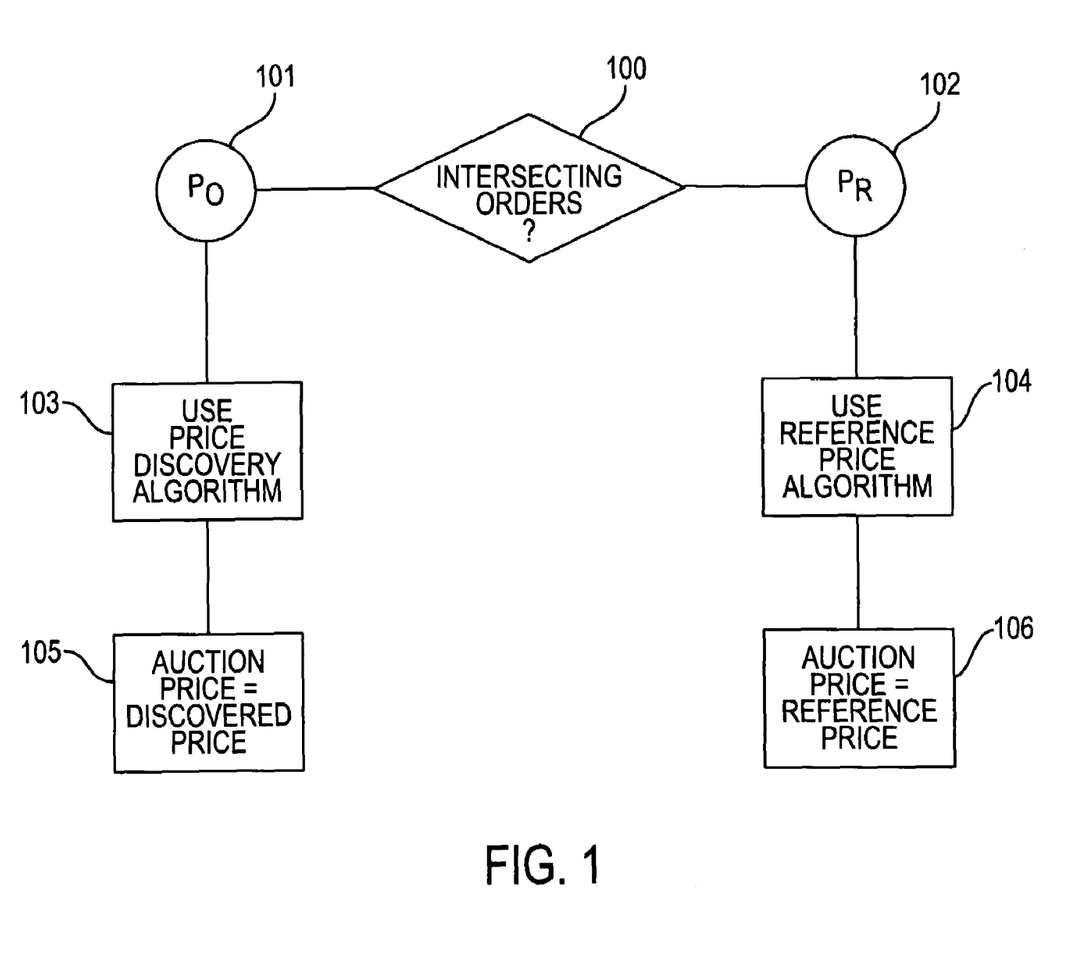
FIG. 1 is a flow chart generally depicting the method whereby the price for a particular asset in a given auction is selected according to embodiments of the present invention.

In accordance with a preferred embodiment of the present invention, at the beginning of the price discovery period as depicted in FIG. 1, a determination 100 is made as to whether an optimal price ("$P_o$") can be discovered which will maximize the share transaction quantity 101, or whether there are no intersecting priced orders such that a reference price must be used 102. Where there are intersecting priced orders, the invention proceeds to discover an optimal price using a price discovery algorithm 103.

The price discovery algorithm 103 employed during the price discovery period of auction cycles in embodiments of the present invention uses the information contained in priced orders in the limit order book for each auction cycle to calculate, based upon relative supply and demand, a discovered price. This is the price at which all trades of a given security will occur for that particular auction cycle. Preferably, the operation of the price discovery algorithm is automated, such as by software running on a computerized network.

Figure 2:
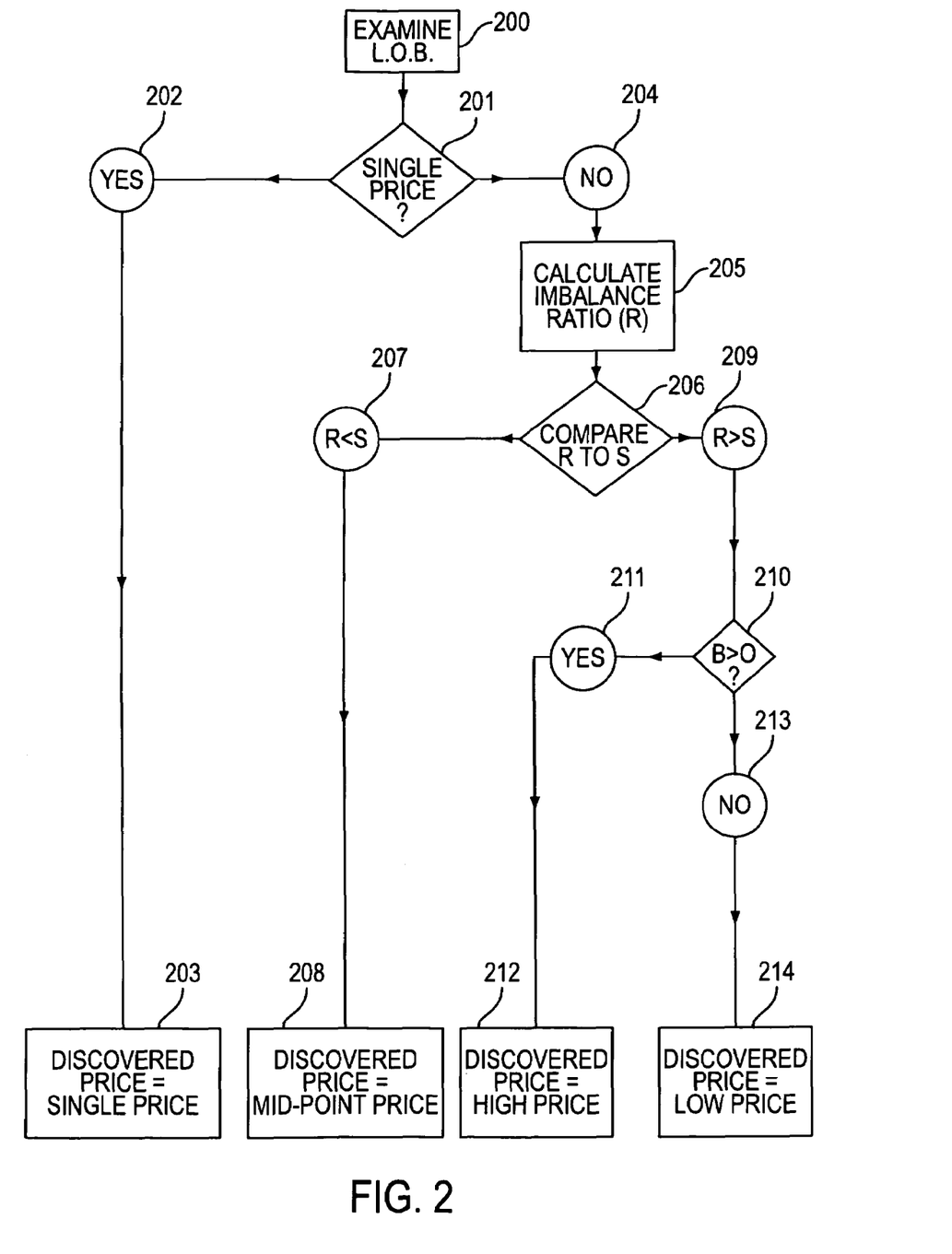
FIG. 2 is a flow chart depicting the method whereby the price discovery algorithm is used to discover an optimal price according to embodiments of the present invention.

FIG. 2 depicts in detail the operation of a preferred price discovery algorithm 103 according to the present invention. To begin the price discovery algorithm, the order book. ("O.B.") is examined 200 to identify a price 201 for a given security at which the volume of shares traded will be maximized. In the event that a single security price 202, a "discrete" price, is identified which will cause a maximum amount of shares (from priced orders) to be executed, that discrete price is identified as the discovered price 203.

EXAMPLE 1

Buyer A enters a priced order offering to buy 10,000 shares for ½.
Buyer B enters a priced order offering to buy 10,000 shares for ⅜.
Seller X enters a priced order offering to sell 10,000 shares for ⅜.
Seller Y enters a priced order offering to sell 10,000 shares for ⅜.
At a price of ½, only A is willing to buy, thus only 10,000 shares would be executed. At a price of ⅜, 20,000 shares would be executed as both A and B are willing to buy 10,000 apiece while X and Y are willing to sell 10,000 apiece. Since there is a single volume maximizing price, the discovered price equals ⅜.

The volume of unpriced orders will be included in the cumulative supply and demand of volume. For example, if there are 50,000 units of unpriced buy orders and 25,000 units of unpriced sell orders, these shares will be added to volume of priced buy and sell orders, respectively, at each price. If unpriced orders meet priced orders that do not intersect, these unpriced orders will cross at the volume-maximizing price with the corresponding priced orders. In the event that there are only unpriced buy and sell orders, the unpriced orders will trade at the reference price.

EXAMPLE 2

Buyer A enters a priced order offering to buy 10,000 shares at a price of 50.00, and an unpriced order offering to buy 50,000 shares at the determined price.
Buyer B enters a priced order offering to buy 5,000 shares at a price of 50.10.
Seller X enters a priced order offering to sell 20,000 shares at a price of 50.30, and an unpriced order offering to sell 25,000 shares.
Seller Y enters a priced order offering to sell 15,000 shares at a price of 50.20.
Between A, B, X, and Y there are unpriced and non-intersecting priced buy and sell orders on for the particular auction cycle. At a price of 50.00, buyer A would be willing to buy a total of 60,000 shares and buyer B would be willing to buy a total of 5,000 shares. Thus, aggregate demand at a price of 50.00 is 65,000 shares. At this price, neither of seller X's or seller Y's priced orders would be executed. Thus, aggregate supply would equal the total number of unpriced order shares, 25,000.
At a price 50.10, buyer B is willing to buy a total of 5,000 shares, buyer A is willing to buy a total of 50,000 shares (this number being the number of unpriced shares ordered by buyer A). For this price, again neither seller X nor seller Y are willing to buy any priced shares. Therefore, aggregate supply is 25,000 shares.
At a price of 50.20, aggregate demand equals 50,000 shares (this being the number of shares represented by unpriced buys), and aggregate supply is 40,000 shares (this being the number of shares available for sale at a price of 50.20 plus the number of unpriced shares offered).
At the price of 50.30, aggregate demand equals 50,000 and aggregate supply equals 60,000.
Taking the smaller of aggregate demand and aggregate supply at each of the above prices, we will find the total number of shares which will transact at that particular price. Thus, at a price of 50.00, 25,000 shares would be transacted, at 50.10, 25,000 shares would be transacted, at 50.20, 40,000 shares, and at 50.30, 50,000 shares. Therefore, the maximum amount of shares will transact at a share maximizing price of 50.30 wherein 50,000 shares will be executed.

Often, a discrete price cannot be identified. In these circumstances, the price discovery algorithm used in embodiments of the present invention will identify a range of prices 204 that will cause a maximum amount of shares to be executed. Along this range of prices, the amount of shares traded would be constant. In instances where a discrete price cannot be identified, the price discovery algorithm uses the relative amounts of bids (offers to buy) and offers (offers to sell) to determine which price along the range of volume maximizing prices will be discovered.

The price discovery algorithm according to embodiments of the present invention in circumstances where no discrete price is identified first makes a determination 205 as to whether the bid shares are substantially equal to the offered shares. This can be done, for example, by mathematically computing an imbalance ratio ("R") defined as $$R = \frac{|B - O|}{L} \qquad \text{Equation 1}$$

wherein "B" is defined as the number of shares bid to buy at the highest price within the volume maximizing range, "O" is the number of shares offered to sell at the lowest price within the volume maximizing range, and L equals the lesser of O or B. This imbalance ratio is then compared to a predefined standard ("S") for the given security.

Next, in preferred embodiments of the invention the price discovery algorithm compares the imbalance ratio R to the standard S at 206. If the imbalance ratio is less than the appropriate standard 207, the discovered price is identified as the mid-point price within the share volume maximizing range of prices 208. This represents a determination that the net order imbalance is not large enough to significantly impact price.

EXAMPLE 3

Same facts as example 1, except that X and Y only wish to sell 5,000 shares apiece for ⅜.
The standard "S" for the particular stock in question is 0.25 (representing a belief that a 25% excess of supply over demand, or vice versa, would constitute a large enough net order imbalance to significantly impact price).
Using equation 1, B is 10,000, O is 10,000, and L is 10,000, thus R is calculated to equal 0.00 (i.e., no net order imbalance). Since R is less than S, the net order imbalance is deemed to not significantly impact price.
Given that X and Y will sell 5,000 shares apiece (10,000 total) whether the price is ½ or ⅜ (there is no single volume maximizing price) and that R is less than S, the discovered price will be the mid-point of the volume maximizing range (⅜ to ½). Thus, the price is 7/16.

If the imbalance ratio is greater than the appropriate standard 209, the imbalance of supply and demand of the particular stock within the volume maximizing range is considered to have become large enough to impact price. Where the number of shares bid for is found to significantly outnumber the number of shares offered 210 (B>O), the market price is considered demand driven 211 and results in a discovered price equal to the highest price within the share maximizing range. Conversely, where offers significantly outweigh the number of bids (O>B), the market price is supply driven 213 and results in a discovered price equal to the lowest price within the share maximizing range 214.

EXAMPLE 4

The same facts as in example 3, except that a third buyer, Buyer C, submits a priced order to buy 10,000 shares at ½.

Using equation 1, B is 20,000, O is 10,000, and L is 10,000, thus R is calculated to equal 0.50. Since R is greater than or equal to S (in this instance S=0.25), the net order imbalance is deemed to significantly impact price.

This net order imbalance creates a demand driven price, thus the discovered price is set to the highest price within the volume maximizing range, namely ½.

In alternative embodiments of the present invention, more than one standard may be used. In addition to the standard S which, if exceeded, denotes order imbalances which are large enough to warrant completely tipping the price to either the highest or lowest price within a range, a lower preliminary standard S' can be used to measure when a predetermined partial tipping of price should be employed. Thus, if B>0, and S>R>S', the price would not be demand driven, but only demand pressured. In situations where price is demand or supply pressured, the discovered price would be offset somewhere between the midpoint and the appropriate endpoint of the price maximizing range.

EXAMPLE 5

Buyer D enters a priced order offering to buy 75,000 shares of stock IOU for 50.35.

Seller Z enters a priced order offering to sell 50,000 shares of stock IOU for 49.95.

Stock IOU has a standard, S, set within the auction system equal to 0.60, and a preliminary standard, S', set within the auction system equal to 0.40.

For this example, at any price within the range of 49.95 through 50.35, 50,000 shares of IOU will be exchanged. Using equation 1, the imbalance ratio, R, is calculated to be 0.50, which is less than S, but larger than S'. Thus the price is considered to be demand pressured, but not demand driven. Therefore, the determined price will be selected from a price somewhere between the demand driven price, 50.35, and the mid-point of the bid-offer spread, 50.15. A suitable price, for example, could be 50.25, the mid-point of the range of demand pressured prices.

As will be readily apparent to those of ordinary skill in the art, the standard(s) with which to compare the imbalance ratio to can vary from security to security and based upon prevailing market conditions. When embodiments of the present invention are performed electronically, the standard can be linked to market indicators (security Beta and volatility, for example) preferably provided continuously by an independent electronic wire service. Further, the value of the standard for a single security can be dependent upon whether there is a demand driven (B>O) or supply driven (O>B) imbalance.

Referring again to FIG. 1, at the end of the price discovery algorithm 103, the price at which the security will trade for that particular auction cycle is set equal to the discovered price 105.

For those auctions where no share maximizing price or range of share maximizing prices is discovered 102, such as in the case where there are no buy and sell priced orders which intersect so as to define a share maximizing price, a default price, termed the reference price ("$P_R$"), that is derived from a combination of the orders currently in the order book and continuous market quotes, will be computed according to a reference price algorithm 104. This reference price in turn, as described above, will be used to execute cross orders and unpriced orders 106. Details of the reference price calculation will depend on the specific implementation of the system.

Figure 3:
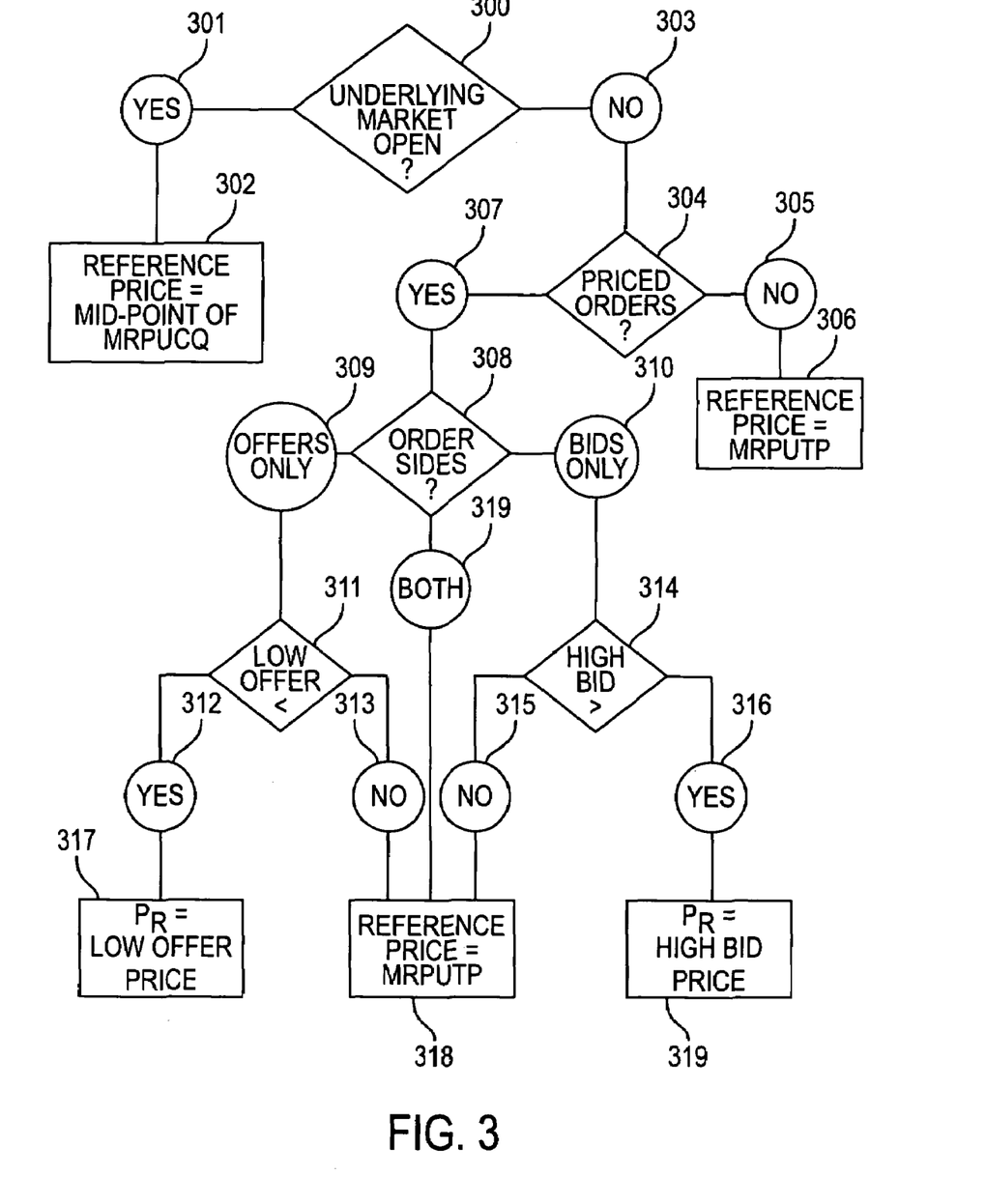
FIG. 3 is a flow chart depicting the method whereby the reference price algorithm is used to identify a reference price according to embodiments of the present invention.
Figure 4:
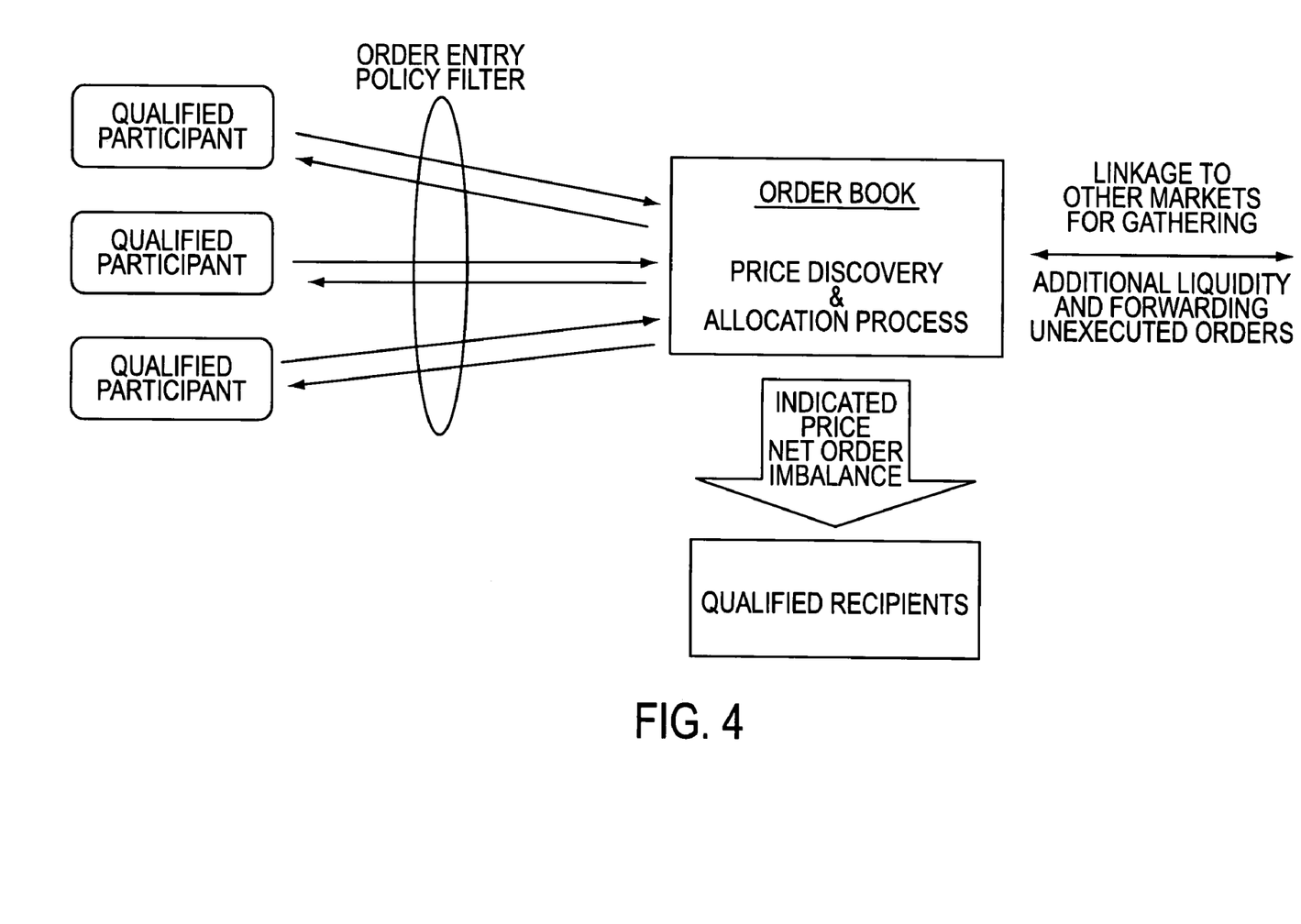
FIG. 4 is a schematic diagram demonstrating the interaction of various factors during operation of a preferred embodiment of the present invention.

In preferred embodiments of the invention, the reference price calculation algorithm will be performed by software running on one or more computers. Referring to FIG. 3, the manner in which the reference price is set depends upon whether the underlying primary market for asset is open 300. For an auction cycle occurring while the underlying market is open 301, the price of the asset on the underlying market can serve as a suitable estimate of the optimal price. Thus, when no volume maximizing price can be identified by the price discovery algorithm due to lack of crossed orders, the mid-point of the of the most recently published unqualified complete quotation (quotation having a valid bid, bid size, valid offer, and offer size; hereinafter, "MRPUCQ") reported by the underlying continuous market prior to the beginning of the price discovery period is set as the reference price 302 for that auction cycle.

For a batch auction cycle occurring while the underlying continuous trading market is closed 303, quotes from trading in the continuous market cannot be used to set the reference price. When the underlying security market is closed 303 and there are no priced buy or sell orders within the system, the reference price can optionally be defined as either the most recently published unqualified trade price ("MRPUTP") 306, which can be obtained from a consolidated tape system or other real time quote service as is known in the art. Alternatively, at step 306, the reference price in such a situation can be set as the mid-point of the closing quote for the asset.

In closed market situations where the order book has priced orders 307 (which are all either on one side or are non-intersecting such that no price can be identified by the price discovery algorithm), the reference price in preferred embodiments of the invention can be set equal to one of three values depending in part on whether there are solely offers solely bids, or both 308. Where there are only priced bids 310 and no priced offers, and the highest bid 314 is higher than the MRPUTP 316, the reference price is set equal to the highest bid price 319. Where there are only priced offers 309, and the lowest offer 311 is lower than the MRPUTP 312, the reference price is set equal to the lowest offer price 317. In all other cases, where there are non-intersecting bids and offers 319, only offers and the lowest offer is greater than the MRPUTP 313, or only bids and the highest bid is less than the MRPUTP 315, the reference price is set equal to the MRPUTP.

As will be appreciated by one skilled in the art, various modifications may be made to the above reference price and price discovery algorithms without departing from the scope and spirit of the invention. For example, both the price discovery and reference price algorithms may be constrained to produce results within a certain range, such as within the bid-offer spread of the underlying primary market. Additionally, constraints may be imposed which require the determined price obtained from either price discovery algorithm or the reference price algorithm to move in discrete steps according to a minimum price variation (or "minimum tick") as defined by the system or by exchange rules. Thus, the price could vary, for example, according ¹⁄₁₆, ¹⁄₃₂, or ¹⁄₆₄ of a dollar, or $0.01 increments.

After a discovered price is identified by the price discovery algorithm or alternatively a reference price is identified by the reference price algorithm, the price discovery period ends and the final part of the auction cycle, the order execution period, begins. During this final period, the volume maximizing amount of shares which are executed at the discovered price are fairly allocated among "qualifying" orders. Qualifying orders include all unpriced orders as well as priced orders that are at least as aggressive (bid orders having a price greater than or equal to the discovered price, and offer orders having a price less than or equal to the discovered price) as the discovered or reference price. During the order execution period, each qualifying order will receive a pro-rata allocation of the available liquidity, i.e, the shares of the given security which will be traded during that particular auction cycle.

EXAMPLE 6

Given the facts according to example 3, the full 10,000 shares sold by X and Y at 7/16 is allocated to A because the discovered price is higher than the price entered by B. Thus, A is the only buyer willing to pay the discovered price.

EXAMPLE 7

Given the facts according to example 4, the 10,000 shares sold by X and Y at ½ is allocated pro-rata to each buyer willing to meet that discovered price. Buyers A and C are both willing to buy up to 10,000 shares apiece at a price of ½, thus the shares are allocated equally between them. Thus, A and C are each allocated 5,000 shares at ½.

After the trades are allocated among qualifying orders, each trader is preferably notified of the results of their order, including whether a trade did or did not occur, whether their order was a qualifying order, the price at which trades occurred (if applicable), and the quantity traded shares allocated to him (if applicable). Optionally, in embodiments of the present invention, other information can be provided to the trader post auction including the net order imbalance and total number of shares executed. When qualifying orders are electronically submitted, trader notification of auction results can be performed electronically as well.

A batch auction system in preferred embodiments of the present invention is connected to one or more ECNs such that non-executed shares can be sent automatically to outside sources for execution. Thus, participants who had submitted priced orders having less aggressive prices than the discovered price, or having a net order imbalance, could opt to have their desired trades completed outside the batch auction.

As will be apparent to one of ordinary skill in the art, the present system can be modified in a variety of manners to provide additional functional features. By way of example, the permissible order types may be modified, or new order types introduced in alternative embodiments of the present invention. Such a new order type could be in the form of a "contingent order" which represents a desire by the trader to "only buy security A if I can sell security B and the price ratio of A:B is less than X." Also by way of example, order types may be modified to allow the specification of portfolio dollar constraints. Such constraints would permit a series of orders for different securities to be linked as a portfolio, and only permit orders in that portfolio to be executed to the extent that maximum levels (in value terms) of net buying and selling are not exceeded.

The invention being thus described, it will be apparent to those skilled in the art that the same may be varied in many ways without departing from the spirit and scope of the invention. Any and all such modifications are intended to be included within the scope of the following claims.

What is claimed is:

1. A computer-implemented method for identifying a price at which to conduct a batch auction of a financial security, comprising the following steps:

accepting a plurality of order requests from a plurality of sources, said order requests containing orders representing a desire to trade the financial security within certain order parameters;

selecting the price at which to trade the security, including determining whether there exists at least one order on each side of a trade containing a price as an order parameter such that at least one purchase price is higher than or equal to at least one selling price, and if so determining from said priced portion of said orders whether there exists a single price at which a maximum number of shares of said security will be traded, and, if so, selecting said single price as a selected price, if there does not exist such a single price, calculating an imbalance ratio of purchase requests of said security to sale requests of said security, and determining the selected price based on the result of a comparison of said imbalance ratio to a predetermined reference value, if no orders on opposite sides of a trade contain intersecting prices, then selecting a predetermined reference price as said selected price; and exchanging a number of shares of the security at the selected price;

wherein said number of shares is a maximum number of shares which can be exchanged based upon said order requests;

wherein said maximum number of shares is a factor for selecting the selected price.

2. A computer-implemented method for identifying a price at which to conduct a batch auction of a financial security, comprising the following steps, each of which are implemented by a computer:

accepting a plurality of order requests from a plurality of sources, said order requests containing orders representing a desire to trade the financial security within certain order parameters;

selecting the price at which to trade the security, including determining whether there exists at least one order on each side of a trade containing a price as an order parameter such that at least one purchase price is higher than or equal to at least one selling price, and if so, determining from said priced portion of said orders whether there exists a single price at which a maximum number of shares of said security will be traded, and, if so, selecting said single price as a selected price, if there does not exist such a single price, calculating an imbalance ratio of purchase requests of said security to sale requests of said security, and determining the selected price based on the result of a comparison of said imbalance ratio to a predetermined reference value, if no orders on opposite sides of a trade contain intersecting prices, then selecting a predetermined reference price as said selected price; and exchanging a number of shares of the security at the selected price;

wherein the selected price lies within a range identified by a bid-offer spread of the asset on a market for the asset.

3. A computer-implemented method for identifying a price at which to conduct a batch auction of a financial security, comprising the following steps:
   accepting a plurality of order requests from a plurality of sources, said order requests containing orders representing a desire to trade the financial security within certain order parameters;
   selecting the price at which to trade the security, including
      determining whether there exists at least one order on each side of a trade containing a price as an order parameter such that at least one purchase price is higher than or equal to at least one selling price, and if so, determining from said priced portion of said orders whether there exists a single price at which a maximum number of shares of said security will be traded, and, if so, selecting said single price as a selected price,
      if there does not exist such a single price, calculating an imbalance ratio of purchase requests of said security to sale requests of said security, and determining the selected price based on the result of a comparison of said imbalance ratio to a predetermined reference value,
      if no orders on opposite sides of a trade contain intersecting prices, then selecting a predetermined reference price as said selected price; and
   exchanging a number of shares of the security at the selected price;
   wherein said orders have order types selected from the group consisting of unpriced orders, cross orders, and priced orders; and
   wherein said cross orders comprise order parameters including a security identifier a quantity of shares for both a purchase order request and a sell order request.

4. A computer-implemented method for identifying a price at which to conduct a batch auction of a financial security, comprising the following steps:
   accepting a plurality of order requests from a plurality of sources, said order requests containing orders representing a desire to trade the financial security within certain order parameters;
   selecting the price at which to trade the security, including
      determining whether there exists at least one order on each side of a trade containing a price as an order parameter such that at least one purchase price is higher than or equal to at least one selling price, and if so, determining from said priced portion of said orders whether there exists a single price at which a maximum number of shares of said security will be traded, and, if so, selecting said single price as a selected price,
      if there does not exist such a single price, calculating an imbalance ratio of purchase requests of said security to sale requests of said security, and determining the selected price based on the result of a comparison of said imbalance ratio to a predetermined reference value,
      if no orders on opposite sides of a trade contain intersecting prices, then selecting a predetermined reference price as said selected price;
   exchanging a number of shares of the security at the selected price; and
   allocating said exchanged shares pro-rata among said orders whose parameters are met by said selected price.

5. A computer-implemented method for identifying a price at which to conduct a batch auction of a financial security, comprising the following steps:
   accepting a plurality of order requests from a plurality of sources, said order requests containing orders representing a desire to trade the financial security within certain order parameters;
   selecting the price at which to trade the security, including
      determining whether there exists at least one order on each side of a trade containing a price as an order parameter such that at least one purchase price is higher than or equal to at least one selling price, and if so, determining from said priced portion of said orders whether there exists a single price at which a maximum number of shares of said security will be traded, and, if so, selecting said single price as a selected price,
      if there does not exist such a single price, calculating an imbalance ratio of purchase requests of said security to sale requests of said security, and determining the selected price based on the result of a comparison of said imbalance ratio to a predetermined reference value,
      if no orders on opposite sides of a trade contain intersecting prices, then selecting a predetermined reference price as said selected price; and
   exchanging a number of shares of the security at the selected price;
   wherein said selecting step is performed according to an algorithm selected from the group consisting of a price discovery algorithm and a reference price algorithm.

6. The method for identifying a price at which to conduct a batch auction of a financial security according to claim 5, whereby said selected price is selected so as to maximize an amount of exchanged shares.

7. A computerized apparatus for identifying a price at which to conduct a batch auction of a security, comprising:
   a computerized network having at least two computers in electronic communication with each other;
   an order receiving program running on one or more of said computers, wherein said receiving program is designed to receive a plurality of messages containing orders from one or more qualified participants;
   an order book database located on one or more of said computers, wherein said order book database communicates with said order receiving program and stores each of said orders received by said receiving program;
   a price selection program running on one or more of said computers, wherein said price selection program refers to said order book database and calculates a single selected price at which to transact a maximum number of shares of the security during the batch auction, said single selected price being determined differently according to whether or not intersecting orders exist in said order book database;
   a batch auction execution program running on one or more of said computers, wherein said execution program executes the batch auction of said maximum number of shares of the security at a given execution time at said selected price;
   wherein said batch auction execution program allocates said maximum number of shares among accepted orders according to a pro-rata distribution of said maximum number of said shares among said orders having a price requirement at least as aggressive as said single price.

8. A computerized apparatus for identifying a price at which to conduct a batch auction of a security, comprising:
   a computerized network having at least two computers in electronic communication with each other;

an order receiving program running on one or more of said computers, wherein said receiving program is designed to receive a plurality of messages containing orders from one or more qualified participants;

an order book database located on one or more of said computers, wherein said order book database communicates with said order receiving program and stores each of said orders received by said receiving program;

a price selection program running on one or more of said computers, wherein said price selection program refers to said order book database and calculates a single selected price at which to transact a maximum number of shares of the security during the batch auction, said single selected price being determined differently according to whether or not intersecting orders exist in said order book database;

a batch auction execution program running on one or more of said computers, wherein said execution program executes the batch auction of said maximum number of shares of the security at a given execution time at said selected price;

wherein said single price is constrained to lie within the bounds identified by a bid-offer spread of the security on a market for the security.

* * * * *